Sept. 18, 1962     E. POPOVITSCH     3,054,364
APPARATUS FOR ASSEMBLING STRINGERS FOR SLIDE FASTENERS
Filed April 15, 1959                                          5 Sheets—Sheet 1

INVENTOR.
ERNST POPOVITSCH
BY R. E. Meech
ATTORNEYS.

Sept. 18, 1962 E. POPOVITSCH 3,054,364
APPARATUS FOR ASSEMBLING STRINGERS FOR SLIDE FASTENERS
Filed April 15, 1959 5 Sheets-Sheet 3

INVENTOR.
ERNST POPOVITSCH
BY R. E. Meech
ATTORNEYS.

Sept. 18, 1962  E. POPOVITSCH  3,054,364
APPARATUS FOR ASSEMBLING STRINGERS FOR SLIDE FASTENERS
Filed April 15, 1959  5 Sheets-Sheet 4

INVENTOR.
ERNST POPOVITSCH
BY R. E. Meech
ATTORNEYS.

United States Patent Office 3,054,364
Patented Sept. 18, 1962

3,054,364
APPARATUS FOR ASSEMBLING STRINGERS FOR SLIDE FASTENERS
Ernst Popovitsch, Stuttgart-Busnau, Germany, assignor to Talon, Inc., Meadville, Pa.
Filed Apr. 15, 1959, Ser. No. 806,623
Claims priority, application Germany, Apr. 17, 1958
18 Claims. (Cl. 112—2)

The present invention relates to a machine for assembling stringers for slide fasteners, also known as zippers, and more particularly to an apparatus for applying a series of scoops or fastener elements to a tape. The scoops utilized in the machine of this invention are substantially U-shaped and form a continuous filament or chain which, together with the tape, constitutes one-half of a slide fastener. The machine further comprises means for fastening a scoop or link chain of predetermined length to the tape, either by utilization of threads or by a high-frequency welding process.

An important object of the invention is to provide a machine of the above outlined character which is capable of applying and connecting selected lengths of interconnected scoops to the tape of a stringer in a continuous operation.

Another object of the invention is to provide a machine of the type as above set forth which is capable of fully and continuously assembling stringers of different lengths.

A further object of the instant invention is to provide a machine for assembling a chain of scoops with the tape of a stringer for slide fasteners whose operation is fully automatic and which is so constructed that any irregularity in the feed of one or more component parts of the stringer automatically arrests the operation.

A still further object of the invention is to provide a machine as above set forth which is capable of automatically separating the chain of interconnected scoops or coupling links into individual sections of requisite length.

A yet further object of the invention is to provide a machine which is capable of automatically spacing the separated sections of scoop chain at intervals of predetermined lengths.

A concomitant object of the present invention is to provide a machine for assembling the component parts of a stringer for slide fasteners which is so constructed that its multifarious components may be driven by a single source of power.

Still another object of the invention is to provide a machine of the above outlined character which is of very compact design, simple in construction, reliable in operation, and which may be utilized for assembling of stringers having tapes of different widths.

The above and certain other objects of the invention are attained by the provision of an apparatus for assembling a single stringer or a continuous train of stringers for slide fasteners which consists essentially of means for advancing the tape, forming one component part of the stringer or stringers, in a plane and preferably in at least partly tensioned condition, and of means for advancing a continuous chain or a series of chain sections formed by interconnected scoops or coupling links toward and into engagement with the tape. The apparatus further comprises means for driving the aforementioned advancing means as well as means, such as a sewing machine or a welding device, for fastening the scoops to the tape to thus form a fully assembled stringer or a train of suitably spaced stringers connected to each other by a common tape. The continuous chain of scoops may be separated or severed into a series of spaced sections of requisite lengths by a cutting assembly whose knives are movable with respect to each other and which is preferably controlled by a fully automatically energizable electromagnetic system.

More particularly, the means for advancing the tape of the stringer or stringers comprises a plurality of advancing and tensioning rolls which guide and stretch the tape in a plane at the point of connection with the scoops, and the latter are moved into engagement with the tape by a specially configurated advancing wheel which is rotated by a suitable drive at such speed as to advance the scoops at the same speed at which the tape advances. The wheel is located in the plane of the tape and, if the chain of scoops is to be severed into a series of sections before being applied to the tape, is preceded by a similar coplanar advancing wheel which is intermittently driven to move the chain toward and into engagement with the first mentioned wheel before the chain is severed by the cutting means.

The chain cutting means and the second advancing wheel may be actuated and driven, respectively, by a single control system which preferably includes timers capable of adjusting the length of sections severed by the cutters from the continuous chain of scoops, and of determining the length of intervals between adjacent chain sections. One of the component elements of the cutting means may be formed with an aperture or passage for permitting the advance of the scoop chain by the intermittently rotated second advancing wheel.

Certain other features of the invention reside in the provision of specially constructed and installed advancing means for the fully assembled stringer or stringers; of means for arresting the main drive when one or more component parts of the apparatus as well as one or more components of the stringer are subjected to excessive stresses; and of a Maltese-cross type transmission which operates the scoop fastening means and may also operate the tape advancing assembly.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

Figure 1:
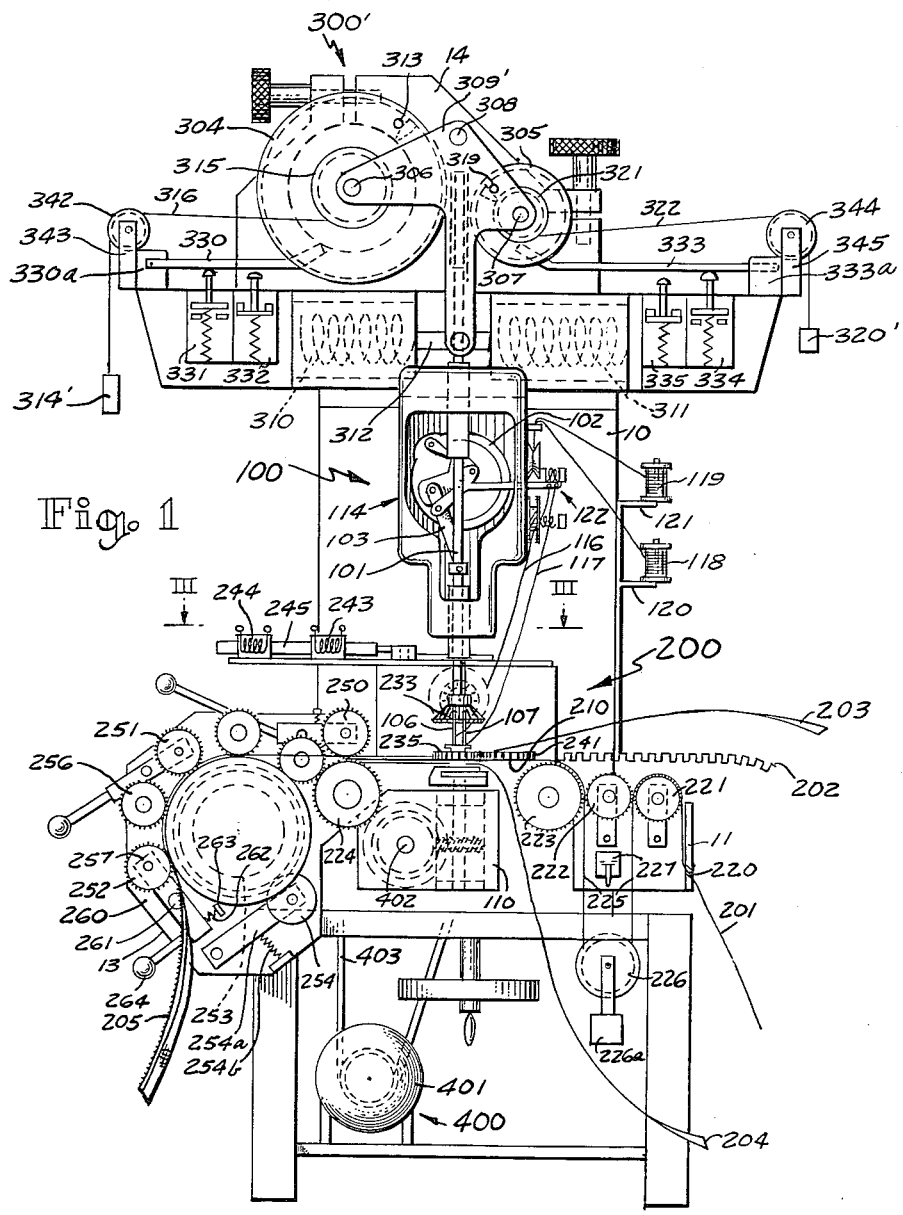
FIG. 1 is front elevational view of the assembled apparatus with the protective housing or outer cover removed.
Figure 6:
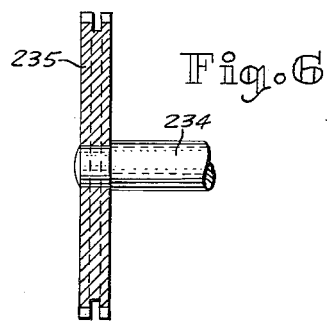
Figure 5:
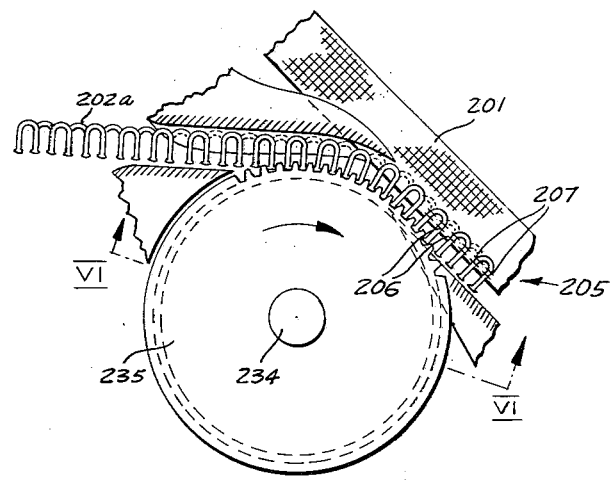
FIG. 5 is greatly enlarged top plan view of a scoop advancing or transporting roller which forms a component part of the conveying assembly shown in FIGS. 3 and 4.
Figure 7:
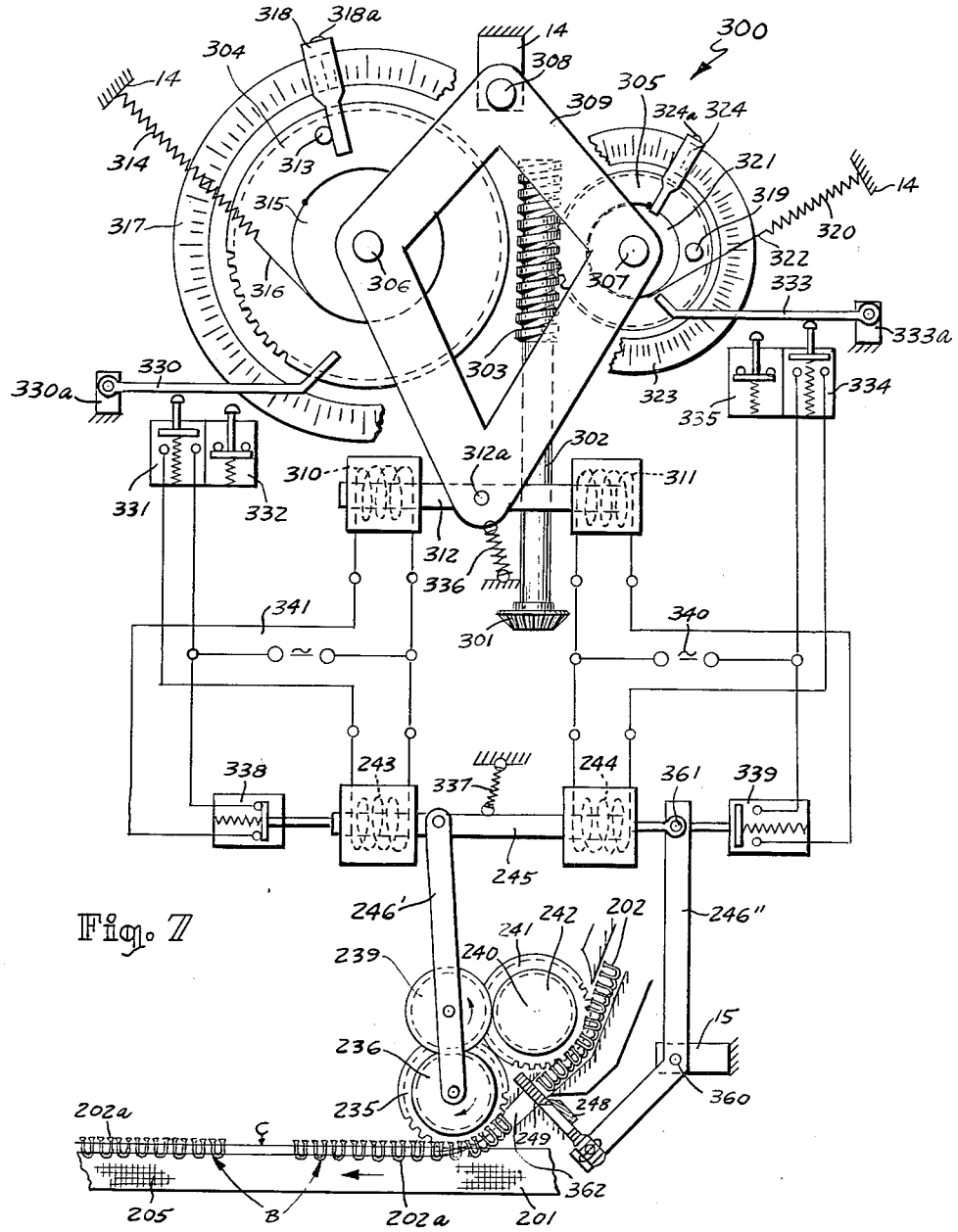

FIG. 6 is a section taken on line VI—VI of FIG. 5, as seen in the direction of arrows; and FIG. 7 is schematic front elevational view of an adjustable assembly for separating the chain of scoops into sections or units of predetermined lengths and for controlling the length of intervals between adjacent chain sections, the assembly of this illustration being slightly different from that shown at the top of FIG. 1.

The machine shown in FIGS. 1 to 7 comprises four main component assemblies, namely, a sewing or scoop fastening machine 100 whose purpose is to secure separated and properly spaced sections of the chain of scoops or fastener elements 202 to the tape 201 and which, as already mentioned hereinbefore, may be replaced by a high-frequency welding apparatus of known design, not shown; a conveying or advancing assembly 200, 230 for the individual components 201-204 of and for the fully assembled continuous train of stringers 205; an assembly 248, 249 and 300 or 300' whose function is to separate the chain of scoops or fastener elements 202 into units or sections 202a of predetermined lengths, to space the separated sections a requisite distance from each other, and to arrest the machine in case of faulty operation; and a drive 400 which imparts motion to each individual assembly or system of the novel apparatus.

Figure 2:
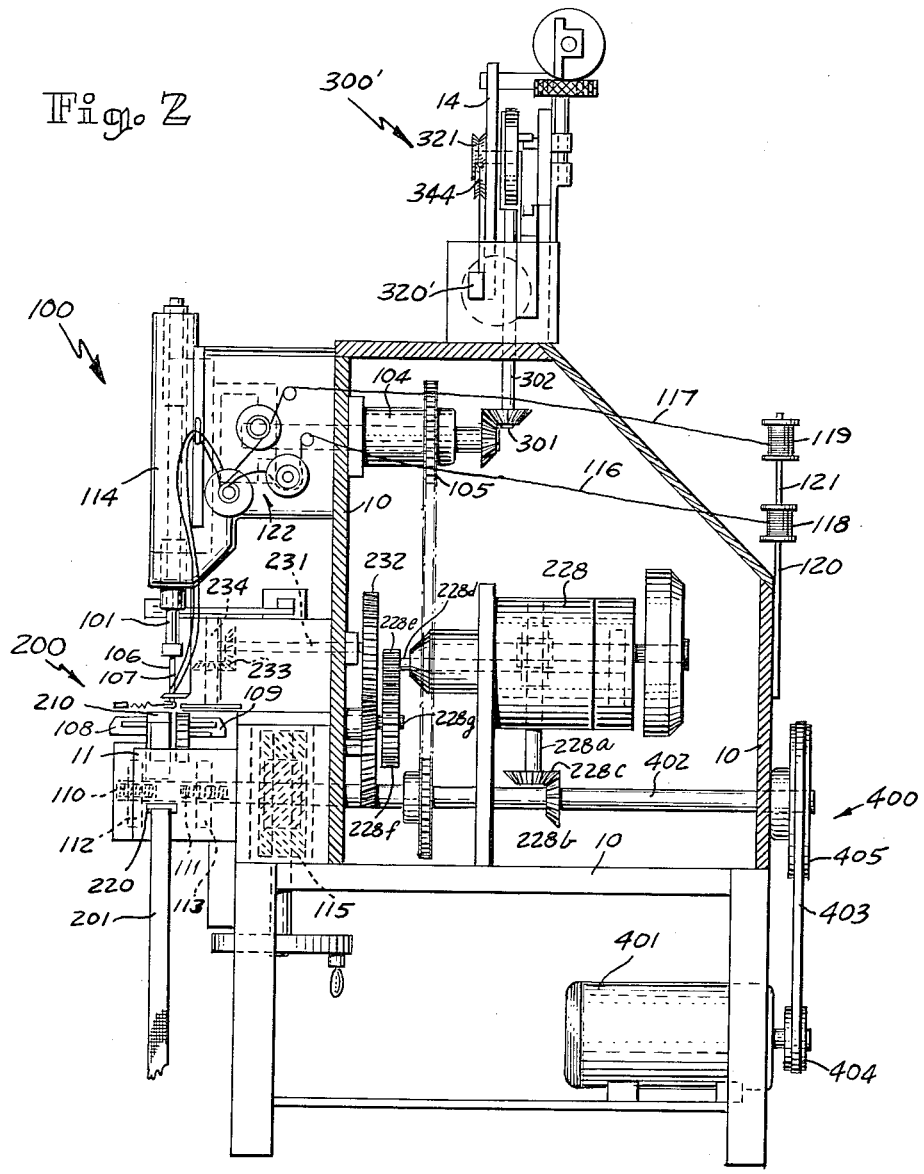
FIG. 2 is side elevational view of the machine as seen from the right-hand end of FIG. 1.
Figure 3:
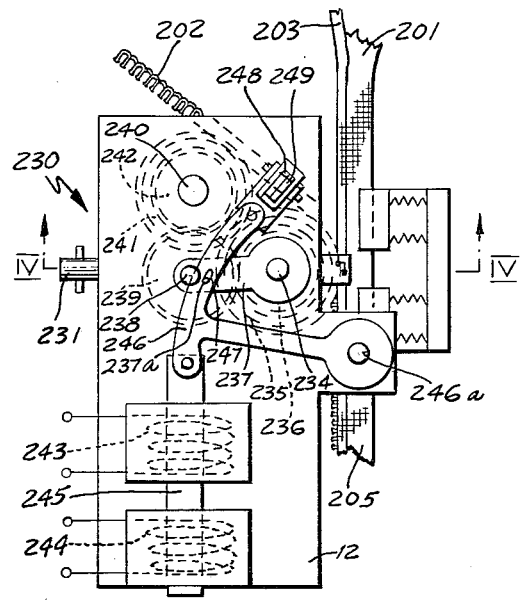
FIG. 3 is an enlarged detail view of the tape and scoop chain conveying assembly substantially as seen from the line III—III of FIG. 1 in the direction of arrows.
Figure 4:
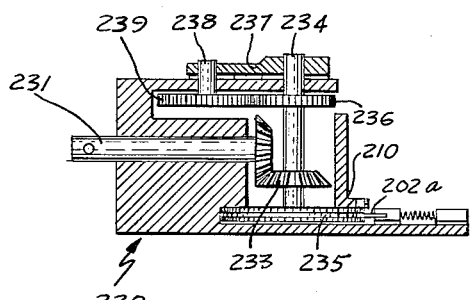
FIG. 4 is transverse vertical section taken on line IV—IV of FIG. 3, as seen in the direction of arrows.

The drive 400 is shown in FIGS. 1 and 2. It comprises an electric motor 401 which rotates a pulley 404 to drive a belt 403. The latter drives a second pulley 405 which is mounted on the main drive shaft 402.

The sewing machine 100, also shown in FIGS. 1 and 2, constitutes a means for fastening the scoops and preferably a pair of strips to the tape 201 and comprises a head 114 reciprocably mounting a needle bar 101 which latter is vertically reciprocable by a crank 102 over a link 103. Crank 102 receives motion from an arm shaft 104 which is driven by main shaft 402 over a chain 105. Needles 106, 107 cooperate with a pair of underbed grippers 108, 109 which latter are driven at twice the angular speed of main drive shaft 402 by pairs of worm shafts 110, 111 and worm wheels 112, 113. Shafts 110, 111 are driven by the main drive shaft 402 over a coupling device 115. Members 108, 109 form part of the lower stitch forming mechanism and may be of any known design.

Threads 116, 117 are led to respective needles 106, 107 from a pair of spools 118, 119, these spools being carried by brackets 120, 121 fixed to the frame 10 of the apparatus. Various thread take-up, tensioning and advancing parts for flexible elements 116, 117 are shown in FIG. 2 and are identified by reference numeral 122. These parts are of known design and their construction forms no part of the present invention.

The component parts of a fully assembled product 205 consisting of a continuous train of interconnected stringers comprise the aforementioned tape 201, the chain of scoops or coupling links 202, an upper holding or covering strip 203, and a lower holding or covering strip 204. These components are led over and past the apertured bed plate 210 by the conveying assembly 200, 230. Special guide means are provided for properly leading the tape 201 and the chain of interconnected scoops 202 to the point of actual assembly above the bed plate 210, and for properly guiding the fully assembled train of stringers 205 from said point.

The tape 201 is led through an inlet slot 220 in a bracket 11 of frame 10 and thence about a first tensioning roll 221 and a freely suspended weighted runner or pulley 226 over the periphery of an advancing roll 223 toward and above the upper face of the bed plate 210. Members 221, 223 are in mesh with an intermediate tensioning roll 222 located above the pulley 226. This pulley causes the tape 201 to form a downwardly extending loop 225 and, should the loop become shorter because of improper operation of tape advancing and tensioning rolls 221-223, or because of an imperfection in the tape 201, pulley 226 with its weight 226a will be lifted sufficiently to trip a control or disconnecting switch 227 located thereabove to thus arrest the main drive motor 401.

At the other side of bed plate 210, the already assembled train of stringers 205 consisting of previously described components 201-204 is drawn by a second advancing roll 224. Members 223, 224 are driven intermittently by a Maltese-cross type transmission 228 (see FIG. 2), and the tensioning rolls 221, 222 are rotated synchronously by the advancing roll 223. The connection between transmission 228 and main drive shaft 402 comprises an input shaft 228a and meshing bevel gears 228b, 228c on members 402, 228a, respectively. Roll 223 is driven by the output shaft 228d of transmission 228 over meshing gears 228e, 228f and a further shaft 228g. The connection between transmission 228 and the second advancing roll 224 is analogous. In order to insure that the tape 201 is led over plate 210 in sufficiently tensioned condition while the attachment of chain sections 202a and of strips 203, 204 takes place, the diameter of transporting or advancing roll 224 preferably slightly exceeds that of roll 223.

The conveying assembly 230 for the chain of scoops or coupling links 202 and for the sections 202a of said chain is actuated by a shaft 231 which is rotated by a gear 232 driven by transmission 228, and by bevel gears 233 which connect shaft 231 with a constantly driven shaft 234. The latter carries and continuously drives a toothed wheel 235 for advancing the chain sections 202a. The peripheral zone of wheel 235 is so configurated (see FIGS. 4 to 6) as to engage with the individual elements of scoop chain 202 and to advance same toward the point of engagement with tape 201. Shaft 234 also constantly rotates a coaxially mounted gear 236 and pivotally supports a swingable lever 237 which latter carries a pivot pin 238 for an idler gear 239. Gears 236, 239 are in constant mesh with each other (see FIGS. 3 and 4).

The intermittently driven peripherally toothed advancing wheel 241 for the chain of scoops 202 is installed on a shaft 240 together with a toothed gear 242 which latter meshes with idler gear 239 when the chain 202 advances, i.e. the swingable lever 237 on whose pivot pin 238 the gear 239 is mounted can cause the chain of scoops 202 to advance when swung about shaft 234 into a position to bring the members 239, 242 into mesh with each other, the advance of scoops being brought about by wheel 241 which, as above stated, is coaxially mounted and connected for rotation with gear 242 on shaft 240. The lever 237 is swingable by a two-armed lever 246 which is pivotally connected to a carrier plate 12, the latter forming part of frame 10, by a trunnion 246a and one arm of which is formed with a closed cam slot 247 for reception of a pin 237a connected to lever 237. The other arm of lever 246 is articularly connected to the common core 245 of two electromagnets or solenoids 243, 244. The free end of that arm of lever 246 which is formed with cam slot 247 carries a pair of cutters or knives 248, 249, the purpose of members 248, 249 being to sever or separate a requisite length or section 202a (see FIG. 7) from the chain 202. Thus, magnetic means 243-245 control not only the movements of lever 237 and hence the advance of chain 202, but also the operation of cutters 248, 249 which latter divide the continuous chain of scoops 202 into a series of shorter or longer chain sections 202a each consisting of interconnected substantially U-shaped scoops or coupling links best shown in FIG. 5. This illustration further shows that the two rows of teeth on the peripheral zone of wheel 235 are so spaced and of such magnitude as to be only partially receivable between the scoops of a section 202a. The other advancing wheel may but need not be formed in similar fashion.

Once a section 202a of chain 202 is applied to the edge of tape 201 while passing along the bed plate 210, needles 106, 107 form two preferably closely adjacent rows of stitches 206, 207 therein to connect the scoops with the tape as well as with the upper and lower holding strips 203, 204, respectively. Thus, the train of stringers 205 is fully assembled on the bed plate 210 of fastening assembly 100 and is then advanced by a drum 257 after passing over the aforementioned advancing and tensioning roll 224. Member 257 is driven synchronously by roll 224 over an idler gear 258 (see FIG. 1) which allows for a smooth, intermittent withdrawal of fully assembled stringers 205.

In order to insure continuous advance of stringer train 205 along roll 224 and along the periphery of drum 257, there is provided a number of presser rolls 250, 251, 252 the first of which cooperates with roll 224 while members 251, 252 cooperate with the drum 257. The sections 202a of chain 202, when applied and connected to the tape 201, form a series of bulges B at one longitudinal edge of the latter (see bottom of FIG. 7), these bulges being spaced at intervals or gap spaces C corresponding in length to the selected distance between adjacent units or sections 202a of chain 202. The length of sections 202a depends upon the desired length of a stringer, i.e. upon the desired length of a slide fastener consisting of two stringers and a slide of known design. The fully assembled and still uninterrupted train of stringers 205 may be separated into a series of individual stringers of requisite length as soon as it emerges past the presser roll 252 (see FIG. 1), for example, by cutting the tape 201 within each interval C between adjacent chain sections 202a.

The aforementioned intervals or gap spaces C between adjacent units or sections 202a of chain 202 on the edge of tape 201 would normally render it impossible to uniformly withdraw the fully assembled product. This is overcome by the provision of an annular groove in the periphery or mantle of drum 257 which freely rotatably receives an annular disc 253 whose smaller diameter is greater than the diameter of said groove, i.e. the disc 253 is angularly and radially movable in the groove of drum 257. A roll 254, mounted on a pivotable arm 254a, is constantly biased by an expansion spring 254b to urge the annular disc 253 into engagement with a pair of presser rolls 255, 256 which are driven at synchronized speed by the drum 257. The distance between rolls 255, 256 is greater than the maximum length of an interval C between adjacent sections 202a of chain 202; thus, at least one of members 255, 256 continuously urges the scoops of fully assembled continuous train of stringers 205 into engagement with drum 257 and in such manner causes advance of the stringer past the drum 257. It will be noted in FIG. 1 that each of presser rolls 250, 251, 252 is mounted on an arm 260 which is swingably mounted on the frame member 13 forming part of frame 10 by a pivot axle 261, and each of rolls 250–252 is constantly urged into engagement with the tape 201 of the stringer train 205 passing over the drum 257 by an expansion spring 262 acting between the free end of arm 260 and a stop 263 carried by frame member 13. In addition, each arm 260 may be pivoted by a handgrip member 264 to move the respective presser roll away from the mantle of drum 257, if desired.

Referring now to FIG. 7, there is shown an assembly 300 whose function is to cause automatic separation of chain 202 into a series of spaced finite units or sections 202a; to determine the length of each section 202a and also to determine the length of intervals or gap spaces C between individual sections. Moreover, this assembly may be adjusted in such manner that the chain 202 is applied to and connected with the edge of tape 201 without any separation into individual units 202a, if desired, i.e. that the machine forms a continuous stringer 205 of indefinite length.

The assembly 300 is driven by an arm shaft 104 (see FIG. 2) over a pair of bevel gears 301 one of which drives a vertical shaft 302. Shafts 104 and 302 are driven at the same speed. Member 302 carries a coaxial worm 303 which latter alternately meshes with a worm wheel 304 and a second worm wheel 305. Wheel 304 determines the length of chain sections 202a, and the other member 305 controls the length of intervals or gap spaces C between adjacent chain sections. Wheels 304, 305 are rotatably mounted on shafts 306, 307, respectively, both carried by a rocker arm 309 which latter is swingable about a trunnion 308 carried by a frame member 14 also forming part of main frame 10. The pendulum- or oscillating movements of arm 309 about trunnion 308 are caused by the core 312 common to two electromagnets or solenoids 310, 311 which is connected to member 309 by a pivot axle 312a.

Rocker arm 309 is held in either of its two extreme positions by an expansion spring 336 which acts upon its lower end distant from trunnion 308.

Worm wheel 304 carries a laterally extending stop or limit pin or bolt 313 which is constantly urged into abutment with a finger or indicator 318 when the wheel 304 is out of mesh with the worm 303, i.e. when the member 304 is in the position shown in FIG. 7. Finger 318 is adjacent to the face of an annular dial or scale 317 formed with graduations for indicating the length of chain sections 202a in dependency on the momentary position of finger 318. As is shown in FIG. 7, the latter is adjustably fixed to the dial 317 by a screw 318a. Worm wheel 304 carries a coaxial cable drum 315 to the periphery of which is connected one end of a cable or cord 316. The other end of cable 316 is fixed to an expansible spring 314 which, in turn, is connected to the frame member 14. Thus, resilient member 314, over cable 316, drum 315 and wheel 304, constantly urges stop pin 313 into abutment with finger 318 when the rocker arm 309 is in its left-hand extreme position in which the wheel 304 is out of mesh with worm 303.

The other worm wheel 305 carries a stop pin 319 which is constantly urged into abutment with a finger 324 by the assembly of a drum 321 coaxially mounted on and fixed to member 305 for rotation about pivot pin or shaft 307, by a flexible element or cable 322 having an end fixed to and extending about the periphery of drum 321, and by an expansible spring 320 fixed to the other end of cable 322 and also connected to the frame member 14. Finger 324 cooperates with a dial 323 and is adjustable with respect thereto upon release of a screw 324a. Dial or scale 323 is formed with graduations indicating different lengths of intervals or gap spaces C between adjacent units or sections 202a of scoop chain 202. In the position of FIG. 7, the stop pin or bolt 319 is spaced from and moves away from finger 324 because the wheel 305 is in mesh with and is rotated by the worm 303 in clockwise direction.

A switch lever 330 is pivotally connected to a bracket 330a, also carried by frame member or section 14 and has a suitably shaped free end extending into the path of stop pin 313 when the latter is rotated with wheel 304 by the worm 303. Pin 313 then depresses the lever 330 and causes the latter to trip a circuit closing switch or contactor 331 and, in certain instances, a circuit breaker or disconnecting switch 332.

A second switch lever 333, swingably connected to a bracket 333a, extends into the path of stop pin 319 when the latter is rotated with wheel 305 by the worm 303, as is shown in FIG. 7. The lever 333 is then caused to trip a circuit closing switch or contactor 334 and eventually a second disconnecting switch or circuit breaker 335.

As before stated, expansion spring 336 constantly urges the rocker arm 309 into one of its extreme positions, and a similar spring 337 acts in analogous manner upon the common core 245 of electromagnets 243, 244. The ends of core 245 alternately operate a pair of circuit closing switches or contactors 338, 339, respectively, depending upon whether the core 245 is in its left-hand or right-hand end position, respectively.

The assembly of parts shown in FIG. 7 operates as follows:

Worm wheel 305 meshes with and is rotated by member 303; therefore, the stop pin 319 travels in an arcuate path about shaft 307 toward the free end of switch lever 333. The other worm wheel 304 is idle and its stop pin 313 abuts against the finger 318. The magnetic core 245 is in its left-hand end position and thus trips the contactor 338; in this position of member 245, the idler gear 239 on a slightly modified two-armed lever 246' is moved out of mesh with the gear 242 and, consequently, the wheel 241 for advancing the chain is now idle. The chain section advancing wheel 235 rotates continuously and thus applies the tangentially moving chain section 202a to the edge of tape 201 as the latter passes in tensioned condition along the bed plate 210 (see also FIG. 1). The planes of plate 210 and of members 235, 236, 239, 241 and 242 are parallel with each other; gears 236, 239 and 242 are coplanar; and the chain 202, chain section 202a, tape 201, wheel 235 and wheel 241, too, are disposed in a common plane.

It will be noted that the chain section 202a shown in contact with wheel 235 in FIG. 7 is already separated from the temporarily arrested chain 202, i.e. the cutters 248, 249 were operated by the core 245 over a lever 246" to sever off the section 202a. As soon as this section is applied to the edge of tape 201, needles 106, 107 form two rows of stitches 206, 207 (see FIG. 5) in the tape to permanently connect the scoops of section 202a thereto. The sewing assembly 100 and the strips 203, 204 have been omitted in FIG. 7 for the sake of clarity.

As the stop pin 319 advances toward and finally reaches the switch lever 333, the latter is swung about its bracket 333a to trip the contactor 334 and to thus close the circuit of a source 340 of electrical energy. This energizes the electromagnet or solenoid 244 which causes the core 245 to move into its right-hand end position whereby the latter opens contactor 338 and trips the right-hand circuit closing switch 339. The latter closes the circuit of source 340 and of electromagnet or coil 311 whereby the latter causes the core 312 to move in a direction to right and the connecting pin or pivot axle 312a entrains the rocker arm 309 into its right-hand extreme position. The wheel 305 is moved out of mesh with worm 303 and the spring 320 immediately returns the stop pin 319 into abutment with the finger 324.

Simultaneously with the oscillatory movement of rocker arm 309 under the influence of core 312, wheel 304 is moved into mesh with worm 303 and the stop pin 313 begins to travel in an arcuate path about shaft 306 in the direction toward the free end of switch lever 330.

Due to the above described movement of core 245 in the direction toward the contactor 339, the cutter 249 is caused by its lever 246" to move into such position that it permits the chain 202 to travel toward the edge of tape 201 under the influence of advancing wheel 241. As is shown in FIG. 7, member 246" is a two-armed lever pivoted to frame member 15 by a pivot axle 360 and having one arm articulately connected to the core 245 by a pin 361. The other end of lever 246" is connected to cutter 249 which latter is formed with an aperture or cutout (not shown) sufficient to permit passage of chain 202 when the lever 246" is pivoted by core 245 in clockwise direction about the pivot axle 360. In addition, as the core 245 moves to right, lever 246' causes the gear 239 to move into mesh with gear 242 and the latter thus rotates the wheel 241 which advances the chain 202 through the aperture or cutout in cutter 249 and through a guide tube or channel 362 in a direction toward the edge of tape 201.

When the stop pin 313 reaches and depresses the lever 330 to trip the contactor 331, the latter closes the common circuit of battery or current source 341 and electromagnet or solenoid 243. Member 243 becomes energized and returns the core 245 in a direction to left, i.e. into the position of FIG. 7. The core 245 trips the switch 338 and the latter closes the circuit of electromagnet or solenoid 310 to energize the latter and to thus cause return movement of core 312 into the position of FIG. 7. Wheel 304 is moved out of mesh with worm 303 and the spring 314 returns stop pin 313 into abutment with finger 318. As the core 245 returns to left, lever 246" displaces the cutter or knife 249 which, together with the other cutter 248, severs a section 202a from the scope or link chain 202. Simultaneously with the displacement of cutter 249 by its lever 246", the lever 246' moves gear 239 away from meshing engagement with member 242 and the rotation of chain advancing wheel 241 is then arrested.

The core 312, due to its movement into left-hand extreme position, brings the wheel 305 back into mesh with worm 303 and the movement of stop pin 319 toward the switch lever 333 begins anew in the above described manner. While the wheel 305 rotates, advancing wheel 235 causes the just separated section 202a to move onto the edge of tape 201 so that an interval C of requisite length is formed between the rear end of separated section 202a and the forward end of chain 202, i.e. the rear end of last-separated section moves away from cutters 248, 249 by first passing through tube 362 and thereupon into engagement with the edge of tape 201.

Circuit breakers 332 and 335 are installed in the feed line of the main drive motor 401. Their purpose is, among others, to protect the advancing wheels 235, 241 for sections 202a and chain 202, respectively, from excessive stresses. For example, if the chain 202 should become stuck between the various tensioning and advancing elements, or if the chain is only partly severed by the cutters 248, 249, as well as if the chain should jam in one of the cutters, the intermediate or connecting gear 239 cannot be brought into mesh with gear 242 on the shaft 240 of advancing wheel 241, and the core 245 is then held against movement into the righthand end position. Consequently, the contactor 339 remains open and the rocker arm 309 is held in the position of FIG. 7 causing the wheel 305 to remain in mesh with the worm 303. Thus, the stop pin 319 continues to pivot the switch lever 333 about the latter's bracket 333a until the lever trips the disconnecting switch 335 and arrests the main drive motor 401.

The operation of circuit breaker or disconnecting switch 332 is analogous. It is tripped by switch lever 330 when the rocker arm 309 or the core 312 is prevented from moving into left-hand extreme position to separate the wheel 304 from the worm 303, i.e. when the stop pin 313 is permitted to advance sufficiently to fully depress the lever 330 not only to trip the contactor 331 but also to open the circuit breaker or control element 332.

An additional function of circuit breakers 332, 335 is to protect the contactors 331 and 334 in case of faulty operation or breakdown of electromagnet or solenoid 310 and/or 311, as well as to protect switch levers 330, 333 against excessive stresses.

If it is desired to produce a stringer 205 without intervals C, i.e. one which comprises a tape 201 with a continuous chain 202 of scoops or coupling links attached thereto, the rocker arm 309 is arrested in a median or neutral position whereby both wheels 304, 305 remain out of mesh with worm 303. The advancing wheel 241 is rotated and continuously advances the chain 202 at an angle toward the edge of tape 201 and tangentially into engagement with the advancing wheel 235. The cutter 249 is then in such position that the chain 202 can pass therethrough.

As before stated, the sewing machine 100 may be replaced by a high-frequency welding system. All that is necessary is to replace needles 106, 107 and grippers 108, 109 by suitable welding electrodes.

The interval forming and chain severing system or assembly 300' of FIG. 1 differs only slightly from the assembly 300 of FIG. 7. Thus, rocker arm 309' is of slightly different configuration, and resilient elements 314, 320 are replaced by weights 314', 320', respectively. Cable 316 passes over a pulley 342 fixed to a bracket or bearing 343, and the other cable 322 is led over a second pulley 344 installed in bearing 345. It will be readily understood that the assembly 300' operates in a manner analogous and practically identical with that of the system described in connection with and shown in FIG. 7.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, a second wheel for conveying the chain of scoops toward and coplanar with said first wheel; cutter means located intermediate said wheels for severing the chain into sections of given lengths; drive means for operating said tape advancing means and for continuously rotating said first wheel at such speeds that the tape and the chain sections are advanced at the same speed toward and into engagement with each other to form a train of stringers; means comprising a lever and a gear on said lever constantly driven at the speed of said first wheel, normally connected with said second wheel for rotating the latter at the speed of said first wheel, and swingable by said lever away from said second wheel whereby the latter is idle and arrests the advance of the chain toward said first wheel; and control means operatively connected with said drive means for swinging said lever to move the gear away from said second wheel and for simultaneously actuating said cutter means whereby a section of given length is separated from the chain and advanced by the first wheel into engagement with the tape.

2. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, and a second wheel for conveying the chain of scoops toward and coplanar with said first wheel; cutter means located intermediate said wheels for severing the chain into sections of given lengths; drive means for operating said tape advancing means and for rotating said first wheel at such speeds that the tape and the chain sections are advanced at the same speed toward and into engagement with each other to form a train of stringers; swingable lever means for intermittently actuating said cutter means; gear means connected with said lever means and constantly driven in unison with said first wheel for intermittently rotating said second wheel before said cutter means is actuated; electromagnetic means for swinging said lever means; and adjustable control means for timing the operation of said electromagnetic means whereby the intervals at which said cutter means is actuated may be varied to change the length of sections separated from the chain, and to change the distance between the sections.

3. An apparatus for attaching a chain of interconnected scoops to a tape to form a stringer for slide fasteners which comprises, in combination: means for advancing the tape in a plane including a pair of spaced apart advancing rolls over which the tape is passed, one of said rolls having a diameter greater than the diameter of the other roll and the tape being advanced from said other to said one roll; means for advancing the chain of scoops toward the tape at a point intermediate said rolls, said last mentioned means comprising a wheel adjacent to and located in the plane of the tape intermediate said rolls, the wheel having a peripheral zone so configurated as to entrain the chain and to apply same along the edge of the tape; and means for rotating said rolls and said wheel at equal speeds whereby the tape and the chain are advanced at the same speed toward the point of and into engagement with each other and the tape is held under tension while passing between said rolls.

4. An apparatus for attaching a chain of interconnected scoops to a tape to form a stringer for slide fasteners which comprises, in combination: means for advancing the tape in a plane including a pair of spaced apart rolls over which the tape is passed; means for advancing the chain of scoops toward the tape at a point intermediate said rolls, said last mentioned means comprising a wheel adjacent to and located in the plane of the tape intermediate said rolls, the wheel having a peripheral zone so configurated as to entrain the chain and to apply same to the edge of the tape; means for fastening the chain to the tape whereby the tape and the chain form a stringer; a drum for receiving the stringer from said rolls; presser means for holding the stringer against said drum; and drive means for rotating said rolls and said wheel at such speeds that the tape and the chain are advanced at the same speed toward the point of and into engagement with each other, for operating said fastening means, and for rotating said drum.

5. An apparatus for attaching given lengths of a chain of interconnected scoops to a tape to form a train of stringers for slide fasteners which comprises, in combination: means for advancing the tape comprising a pair of rolls between which the tape is advanced in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, a second wheel coplanar with said first wheel, said second wheel having a peripheral zone so configurated as to entrain the chain of scoops and to advance same toward the peripheral zone of said first wheel; cutter means located intermediate said wheels for severing the chain into sections of given lengths; drive means for constantly rotating said rolls and said first wheel at such speeds that the tape and the chain sections are advanced at the same speed toward and into engagement with each other; means for fastening the scoops to the tape to form a train of stringers; means for advancing the stringers; means operatively connected with said drive means for operating said fastening and stringer advancing means; swingable lever means for intermittently actuating said cutter means; gear means connected with said lever means and constantly driven by the drive means at the speed of said first wheel, said gear means being operatively connected with and adapted to rotate said second wheel at the speed of said first wheel before said cutter means is actuated to advance a given length of the chain beyond said cutter means into engagement with the peripheral zone of said first wheel and being movable by said lever means away from the second wheel when said cutter means is actuated whereby the second wheel is idle and arrests the advance of the chain to form an interval between the chain and the chain section separated therefrom by the cutter means; electromagnetic means for swinging said lever means; and adjustable control means operatively connected with said drive means for timing the operation of said electromagnetic means whereby the intervals at which said cutter means is actuated may be varied to change the length of sections separated from the chain, and to change the lengths of intervals between the sections.

6. An apparatus for attaching given lengths of a chain of interconnected scoops to a tape to form a train of stringers for slide fasteners which comprises, in combination: means for advancing the tape comprising a pair of rolls between which the tape is advanced in a plane; means for advancing the scoops toward the tape, said last mentioned means comprising a first wheel adjacent to and located in the plane of the tape, said wheel having a peripheral zone so configured as to entrain the scoops and to apply same to the edge of the tape, a second wheel coplanar with said first wheel, said second wheel having a peripheral zone so configured as to entrain the chain of scoops and to advance same toward the peripheral zone of said first wheel; cutter means located intermediate said wheels for severing the chain into sections of given lengths; means for fastening the scoops to the tape at a point intermediate said first wheel and that roll to which the tape passes from the other roll whereby the scoops and the tape form a train of stringers; means for advancing the stringers comprising a drum and presser means for urging the stringers into engagement with the drum; drive means for rotating said rolls and said first wheel at such speeds that the tape and the chain sections are constantly advanced at the same speed into engagement with each other, and for rotating said drum; means including a transmission operatively connected with said drive means for actuating said fastening means; swingable lever means for intermittently actuating said cutter means; gear means connected with said lever means and constantly driven by said drive means at the speed of said first wheel, said gear means being operatively connectable with and adapted to rotate said second wheel at the speed of said first wheel when said cutter means is idle to advance a given length of the chain beyond said cutter means into engagement with the peripheral zone of said first wheel and movable by said lever means away from the second wheel when said cutter means is actuated whereby the second wheel is idle and arrests the advance of the chain to form an interval between the chain and the chain section separated therefrom by the cutter means; electromagnetic means for swinging said lever means; and adjustable control means operatively connected with said drive means for timing the operation of said electromagnetic means whereby the intervals at which said cutter means is actuated may be varied to change the length of sections separated from the chain, and to change the lengths of intervals between the sections.

7. An apparatus for attaching given lengths of a chain of interconnected scoops to a tape to form a train of stringers for slide fasteners which comprises, in combination: means for advancing the tape comprising a pair of rolls between which the tape is advanced in a plane; means for advancing the scoops toward the tape, said last mentioned means comprising a first wheel adjacent to and located in the plane of the tape, said wheel having a peripheral zone so configured as to entrain the scoops and to apply same to the edge of the tape, a second wheel coplanar with said first wheel, said second wheel having a peripheral zone so configured as to entrain the chain of scoops and to advance same toward the peripheral zone of said first wheel; cutter means located intermediate said wheels for severing the chain into sections of given lengths; means for fastening the scoops to the tape at a point intermediate said first wheel and that roll to which the tape passes from the other roll whereby the scoops and the tape form a train of stringers; means for advancing the stringers comprising a drum and presser means for urging the stringers into engagement with the drum; drive means for rotating said rolls and said first wheel at such speeds that the tape and the chain sections are constantly advanced at the same speed into engagement with each other, and for rotating said drum; means including a transmission operatively connected with said drive means for actuating said fastening means; swingable lever means for intermittently actuating said cutter means; gear means connected with said lever means and constantly driven by said drive means at the speed of said first wheel, said gear means being operatively connectable with and adapted to rotate said second wheel at the speed of said first wheel when said cutter means is idle to advance a given length of the chain beyond said cutter means into engagement with the peripheral zone of said first wheel and movable by said lever means away from the second wheel when said cutter means is actuated whereby the second wheel is idle and arrests the advance of the chain to form an interval between the chain and the chain section separated therefrom by the cutter means; electromagnetic means for swinging said lever means; adjustable control means operatively connected with said drive means for timing the operation of said electromagnetic means whereby the intervals at which said cutter means is actuated may be varied to change the length of sections separated from the chain, and to change the lengths of intervals between the sections; and means located in advance of said rolls, in the path of the tape, and operatively connected with said drive means for arresting same when the tension in the tape increases beyond a given magnitude.

8. An apparatus for attaching given lengths of a chain of interconnected scoops to a tape to form a train of stringers for slide fasteners which comprises, in combination: means for advancing the tape comprising a pair of rolls between which the tape is advanced in a plane; means for advancing the scoops toward the tape, said last mentioned means comprising a first wheel adjacent to and located in the plane of the tape, said wheel having a peripheral zone so configured as to entrain the scoops and to apply same to the edge of the tape, a second wheel coplanar with said first wheel, said second wheel having a peripheral zone so configured as to entrain the chain of scoops and to advance same toward the peripheral zone of said first wheel; cutter means located intermediate said wheels for severing the chain into sections of given lengths; means for fastening the scoops to the tape at a point intermediate said first wheel and that roll to which the tape passes from the other roll whereby the scoops and the tape form a train of stringers; means for advancing the stringers comprising a drum and presser means for urging the stringers into engagement with the drum; drive means comprising a motor for rotating said rolls and said first wheel at such speeds that the tape and the chain sections are constantly advanced at the same speed into engagement with each other, and for rotating said drum; means including a transmission operatively connected with said drive means for actuating said fastening means; swingable lever means for intermittently actuating said cutter means; gear means connected with said lever means and constantly driven by said drive means at the speed of said first wheel, said gear means being operatively connectable with and adapted to rotate said second wheel at the speed of said first wheel when said cutter means is idle to advance a given length of the chain beyond said cutter means into engagement with the peripheral zone of said first wheel and movable by said lever means away from the second wheel when said cutter means is actuated whereby the second wheel is idle and arrests the advance of the chain to form an interval between the chain and the chain section separated therefrom by the cutter means; electromagnetic means for swinging said lever means; adjustable control means operatively connected with said drive means for timing the operation of said electromagnetic means whereby the intervals at which said cutter means is actuated may be varied to change the length of sections separated from the chain, and to change the lengths of intervals between the sections; and means comprising a switch located in advance of said rolls, a weighted pulley suspended on the tape beneath said switch and liftable by the tape to trip the switch when the tension in the tape increases, and an electric connection between the switch and the motor of said drive means for arresting same when the switch is tripped by said pulley in response to increase in the tension of the tape beyond a given magnitude.

9. An apparatus for attaching a chain of interconnected scoops to a tape to form a stringer for slide fasteners which comprises, in combination: means for advancing the tape in a plane including a pair of spaced apart rolls over which the tape is passed; means for advancing the chain of scoops toward the tape at a point intermediate said rolls, said last mentioned means comprising a wheel adjacent to and located in the plane of the tape intermediate said rolls, the wheel having a peripheral zone so configurated as to entrain the chain and to apply same to the edge of the tape; means for fastening the chain to the tape whereby the tape and the chain form a stringer; a drum for advancing the stringer; first presser means for holding the scoops of the stringer against said drum; second presser means for holding the tape of the stringer against said drum; and drive means for rotating said rolls and said wheel at such speed that the tape and the chain are advanced at the same speed toward the point of and into engagement with each other, and for rotating said drum to advance the stringer therealong.

10. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, and a second wheel for conveying the chain of scoops toward and coplanar with said first wheel; cutter means located intermediate said wheels for severing the chain into sections of given lengths; drive means for operating said tape advancing means and for rotating said first wheel at such speeds that the tape and the chain sections are advanced at the same speeds toward and into engagement with each other; means for intermittently actuating said cutter means; means for intermittently rotating said second wheel at the speed of said first wheel whereby to advance a given length of the chain beyond said cutter means before the latter is actuated; means for timing the operation of said cutter actuating means and of the means for rotating said second wheel whereby to form intervals between the chain sections; means operated by said drive means for fastening the scoops of each section to the tape to form a train of stringers; means for advancing the train of stringers including a drum rotated by said drive means and at least two spaced presser rolls for urging the scoops of the chain sections into engagement with the drum, the distance between said presser rolls being less than the length of intervals between the chain sections.

11. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone formed with teeth of a configuration and magnitude slightly greater than the width of and distance between the scoops of the chain and adapted to entrain the scoops and to apply same to the edge of the tape, and a second wheel for conveying the chain of scoops toward and coplanar with said first wheel; cutter means located intermediate said wheels for severing the chain into sections of given lengths; drive means for operating said tape advancing means and for rotating said first wheel at such speeds that the tape and the chain sections are advanced at the same speed toward and into engagement with each other to form a train of stringers; swingable lever means for intermittently actuating said cutter means; gear means connected with said lever means and constantly driven in unison wtih said first wheel for intermittently rotating said second wheel before said cutter means is actuated; electromagnetic means for swinging said lever means; and adjustable control means for timing the operation of said electromagnetic means whereby the intervals at which said cutter means is actuated may be varied to change the length of sections separated from the chain, and to change the distance between the sections.

12. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, and a second wheel for conveying the chain of scoops toward and coplanar with said first wheel; cutter means located intermediate said wheels for severing the chain into sections of given lengths, said cutter means comprising a first and a second cutting member and one of said members being formed with a passage sufficient to permit the advance of the chain therethrough; drive means for operating said tape advancing means and for rotating said first wheel at such speeds that the tape and the chain sections are advanced at the same speed toward and into engagement with each other to form a train of stringers; swingable lever means for intermittently actuating said cutter means; gear means connected with said lever means and constantly driven in unison with said first wheel for intermittently rotating said second wheel before said cutter means is actuated, said one cutting member being movable by said lever means into such position that the chain of scoops may be advanced by the second wheel through said passage therein toward said first wheel; electromagnetic means for swinging said lever means; and adjustable control means for timing the operation of said electromagnetic means whereby the intervals at which said cutter means is actuated may be varied to change the length of sections separated from the chain, and to change the distance between the sections.

13. An apparatus for attaching given lengths of a chain of interconnected scoops to a tape to form a train of stringers for slide fasteners which comprises, in combination: means for advancing the tape in a plane; means for advancing the scoops toward the tape, said last mentioned means comprising a first wheel adjacent to and located in the plane of the tape, said wheel having a peripheral zone so configurated as to entrain the scoops and to apply same to the edge of the tape, and a second wheel for conveying the chain of scoops toward and coplanar with said first wheel; cutter means located intermediate said wheels for severing the chain into sections of given lengths; drive means for operating said tape advancing means and for rotating said first wheel at such speeds that the tape and the chain sections are advanced at the same speed toward and into engagement with each other to form a train of stringers; swingable lever means for intermittently actuating said cutter means; gear means connected with said lever means and constantly driven in unison with said first wheel for intermittently rotating said second wheel before said cutter means is actuated; electromagnetic means for swinging said lever means; and adjustable control means for timing the operation of said electromagnetic means whereby the intervals at which said cutter means is actuated may be varied to change the length of sections separated from the chain, and to change the distance between the sections, said control means comprising a worm driven by said drive means, a swingable rocker arm, a pair of worm wheels on said rocker arm alternately movable into mesh with said worm, second electromagnetic means connected with said rocker arm, means including switch levers and switch means for operating said second electromagnetic means whereby the latter swings said rocker arm and for operating said first mentioned electromagnetic means to actuate said cutter means and to intermittently rotate said second wheel.

14. In a machine for attaching a series of interconnected fastener elements to the edge of a tape to form a slide fastener stringer, the combination of means for feeding and advancing the tape into and through the machine, means for advancing and feeding the chain of fastener elements toward and to the edge of the tape including a first rotatable wheel adjacent to and located substantially in the plane of the tape having a peripheral zone so configurated as to entrain the fastener elements and position them on the edge of the tape, a second rotatable wheel for conveying the chain of fastener elements toward and coplanar with said first wheel, means arranged between said first and second wheels for cutting the chain of fastener elements into sections of predetermined lengths, and means for securely attaching said cut lengths to the edge of said tape.

15. The combination as defined in claim 14, including means for intermittently arresting the rotation of said second rotatable wheel and the movement of the chain of fastener elements into the machine, and means for continuously rotating said first wheel whereby the tape and cut lengths travel along into and through the machine during such arrestment.

16. The combination as defined in claim 14, including a tube arranged adjacent said cutting means for guiding the cut lengths of chain to said first wheel and to the edge of the tape.

17. In a machine for attaching a series of interconnected fastener elements to the edge of a tape to form a slide fastener stringer, the combination of means for feeding and advancing the tape into and through the machine, means for advancing and feeding the chain of fastener elements toward and to the edge of the tape including a first rotatable wheel adjacent to and located substantially in the plane of the tape having a peripheral zone so configurated as to entrain the fastener elements and position them on the edge of the tape, a second rotatable wheel for conveying the chain of fastener elements toward and coplanar with said first wheel, means arranged between said first and second wheels for cutting the chain of fastener elements into sections of predetermined lengths, means for measuring automatically predetermined lengths to be cut from the chain of fastener elements, mechanism responsive to the actuation of said measuring means for controlling the rotation of said second wheel and said cutting means, means for measuring automatically the length of intervals between the cut lengths as they are applied to the edge of the tape so as to provide the desired spacing between the cut lengths along the tape edge, and means for securely attaching said cut lengths to the edge of said tape.

18. In a machine for attaching a series of interconnected fastener elements to the edge of a tape to form a slide fastener stringer, the combination of means for feeding and advancing the tape into and through the machine, means for advancing and feeding the chain of fastener elements toward and to the edge of the tape including a first rotatable wheel adjacent to and located substantially in the plane of the tape having a peripheral zone so configurated as to entrain the fastener elements and position them on the edge of the tape, a second rotatable wheel for conveying the chain of fastener elements toward and coplanar with said first wheel, means arranged between said first and second wheels for cutting the chain of fastener elements into sections of predetermined lengths, means for automatically measuring predetermined lengths to be cut from the chain of fastener elements, means for measuring automatically the length of intervals between the cut lengths as they are applied to the edge of the tape so as to provide the desired spacing between the cut lengths along the tape edge, mechanism for controlling alternately the actuation of both said last mentioned measuring means, an electric circuit, a plurality of solenoids arranged in said circuit, said mechanism adapted to control the energization of said solenoids, the actuation of said second wheel and said cutting means adapted to be controlled by the energization and de-energization of said solenoids, and means for securely attaching the cut lengths to the edge of the tape.

References Cited in the file of this patent

UNITED STATES PATENTS

| | | |
|---|---|---|
| 2,661,044 | Schevermann | Dec. 1, 1953 |
| 2,693,234 | Seidman | Nov. 2, 1954 |
| 2,818,037 | McNutt | Dec. 31, 1957 |
| 2,822,770 | Schwartz | Feb. 11, 1958 |
| 2,885,774 | Waldes | May 12, 1959 |

FOREIGN PATENTS

| | | |
|---|---|---|
| 502,602 | Belgium | May 15, 1951 |